(12) United States Patent
Dahlgren

(10) Patent No.: US 6,183,177 B1
(45) Date of Patent: *Feb. 6, 2001

(54) DEVICE FOR SECURING CARGO

(75) Inventor: Nils Dahlgren, Västra Frölunda (SE)

(73) Assignee: AB Volvo (SE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/920,946

(22) Filed: Aug. 29, 1997

(30) Foreign Application Priority Data

Sep. 2, 1996 (SE) .................................................. 9603172

(51) Int. Cl.$^7$ ............................................................ B60P 7/08
(52) U.S. Cl. ............................ 410/100; 410/117; 410/118; 410/129; 410/142
(58) Field of Search ................................. 410/117, 118, 410/100, 129, 142, 97; 280/789; 224/42.33, 42.34; 296/24.1, 37.1, 37.5, 37.6, 37.8

(56) References Cited

U.S. PATENT DOCUMENTS

| | | | |
|---|---|---|---|
| 2,170,913 | * | 8/1939 | Rowe ................................... 410/117 |
| 3,767,253 | * | 10/1973 | Kluetsch .............................. 410/118 |
| 4,264,251 | * | 4/1981 | Blatt ..................................... 410/100 |
| 5,026,231 | * | 6/1991 | Moore .................................. 410/118 |
| 5,207,260 | * | 5/1993 | Commesso ........................ 410/118 X |
| 5,551,726 | * | 9/1996 | Ament ................................... 280/749 |
| 5,632,520 | * | 5/1997 | Butz ................................. 410/118 X |
| 5,702,143 | * | 12/1997 | Shimazaki ........................... 296/24.1 |
| 5,772,370 | * | 6/1998 | Moore ................................. 410/100 |
| 6,007,283 | * | 12/1999 | Labeur ................................... 410/97 |

FOREIGN PATENT DOCUMENTS

| | | | |
|---|---|---|---|
| 295 00 366 U | * | 4/1995 | (DE) . |
| 0381911 | | 8/1990 | (EP) . |
| 0463733 | | 1/1992 | (EP) . |
| 2467115 | | 4/1981 | (FR) . |
| 2647734 | | 12/1990 | (FR) . |
| 251422 | * | 5/1926 | (GB) ................................ 224/42.34 |
| 2131279 | | 6/1984 | (GB) . |
| 91/12155 | | 8/1991 | (WO) . |

* cited by examiner

Primary Examiner—Stephen T. Gordon
(74) Attorney, Agent, or Firm—Lerner, David, Littenberg, Krumholz & Mentlik, LLP

(57) ABSTRACT

Apparatus for securing cargo in the cargo compartment of vehicles is disclosed including a retracting device mounted in the cargo compartment, a flexible band retractably attached to the retracting device so that it can be withdrawn and retracted thereinto, an elongated bar fixed to the flexible band, and at least one recess disposed in the cargo compartment so that the elongated bar can be releasably locked in the recess for securing the cargo with the flexible band in the cargo compartment.

9 Claims, 4 Drawing Sheets

DEVICE FOR SECURING CARGO

FIELD OF THE INVENTION

The present invention relates to a device for securing cargo in a vehicle. More particularly, the present invention relates to a device for securing various kinds of luggage in a cargo or luggage compartment in a motor vehicle.

BACKGROUND OF THE INVENTION

Motor vehicles, e.g. passenger cars, normally comprise a luggage compartment which is intended for storing various kinds of luggage. In connection with conventional motor vehicles, there is a risk that luggage which is stored in the luggage compartment may be poorly secured or that it is not secured at all. This can result in the luggage moving back and forth in the luggage compartment so that it is damaged, which can occur, for example, in the case of sudden braking.

Naturally, loosely secured luggage can also entail risks for those traveling in the vehicle. For this reason, there is a need for devices which stably secure various kinds of cargo in a luggage compartment.

SUMMARY OF THE INVENTION

A principal object of the present invention is to solve the above problems, and to provide an improved device for securing cargo in a cargo compartment of a vehicle, which device preferably has a simple construction which holds the luggage securely and which can be handled in a simple manner.

In accordance with the present invention, these and other objects have now been accomplished by apparatus for securing cargo in the cargo compartment of a vehicle comprising a retracting device mounted in the cargo compartment, a flexible band retractably attached to the retracting device whereby the flexible band can be withdrawn from the retracting device and retracted into the retracting device, a first locking element comprising an elongated bar affixed to the flexible band, and a second locking element comprising at least one recess disposed in the cargo compartment whereby the elongated bar can be releasably locked in the at least one recess for securing the cargo with the flexible band in the cargo compartment. In a preferred embodiment, the elongated bar is affixed to the flexible band in a direction substantially perpendicular to the direction of retraction of the flexible band with respect to the retracting device.

In accordance with one embodiment of the apparatus of the present invention, the retracting device is substantially vertically disposed within the cargo compartment. In a preferred embodiment, the at least one recess is also substantially vertically disposed within the cargo compartment.

In accordance with another embodiment of the apparatus of the present invention, the cargo compartment includes a sill, and the at least one recess is disposed within the sill.

In accordance with another embodiment of the apparatus of the present invention, the at least one recess comprises a substantially cylindrical groove including an opening and a vertical slot extending along the cylindrical groove.

In accordance with another embodiment of the apparatus of the present invention, the retracting device is an automatic locking retractor.

In accordance with another embodiment of the apparatus of the present invention, the cargo compartment includes at least one panel including an aperture, and the retracting device is disposed on one side of the panel and the flexible band extends through the aperture into the cargo compartment.

In accordance with another embodiment of the apparatus of the present invention, the elongated bar is telescopically retractable and extendable with respect to the flexible band.

The present invention thus comprises a net or band-shaped element which is retractable on a retracting device which in turn is fixedly mounted within the luggage compartment. The present invention further comprises a first locking element arranged on the band-shaped element and a second locking element arranged relative to the luggage compartment, with the first locking element and the second locking element being arranged for releasable locking with respect to each other. The present invention is based on the first locking element being a bar and the second locking element being at least one recess, where the bar is arranged to at least partially cooperate with the recess upon locking.

In a preferred embodiment, the recess is an essentially vertical groove in a sill structure in the luggage compartment of the vehicle. The bar can be moved down into this groove when securing the net or band-shaped element.

The present invention is preferably used together with a previously known retracting device of the ALR-kind ("automatic locking retractor") with a band which can be stretched and then slackened, following which the band is secured from being removed from the position of the band subsequent to its being slackened. This contributes to an efficient securing of a load in a luggage compartment.

BRIEF DESCRIPTION OF THE DRAWINGS

The invention will be described in greater detail in the following detailed description, with reference to the appended drawings, in which.

DETAILED DESCRIPTION

Figure 1:
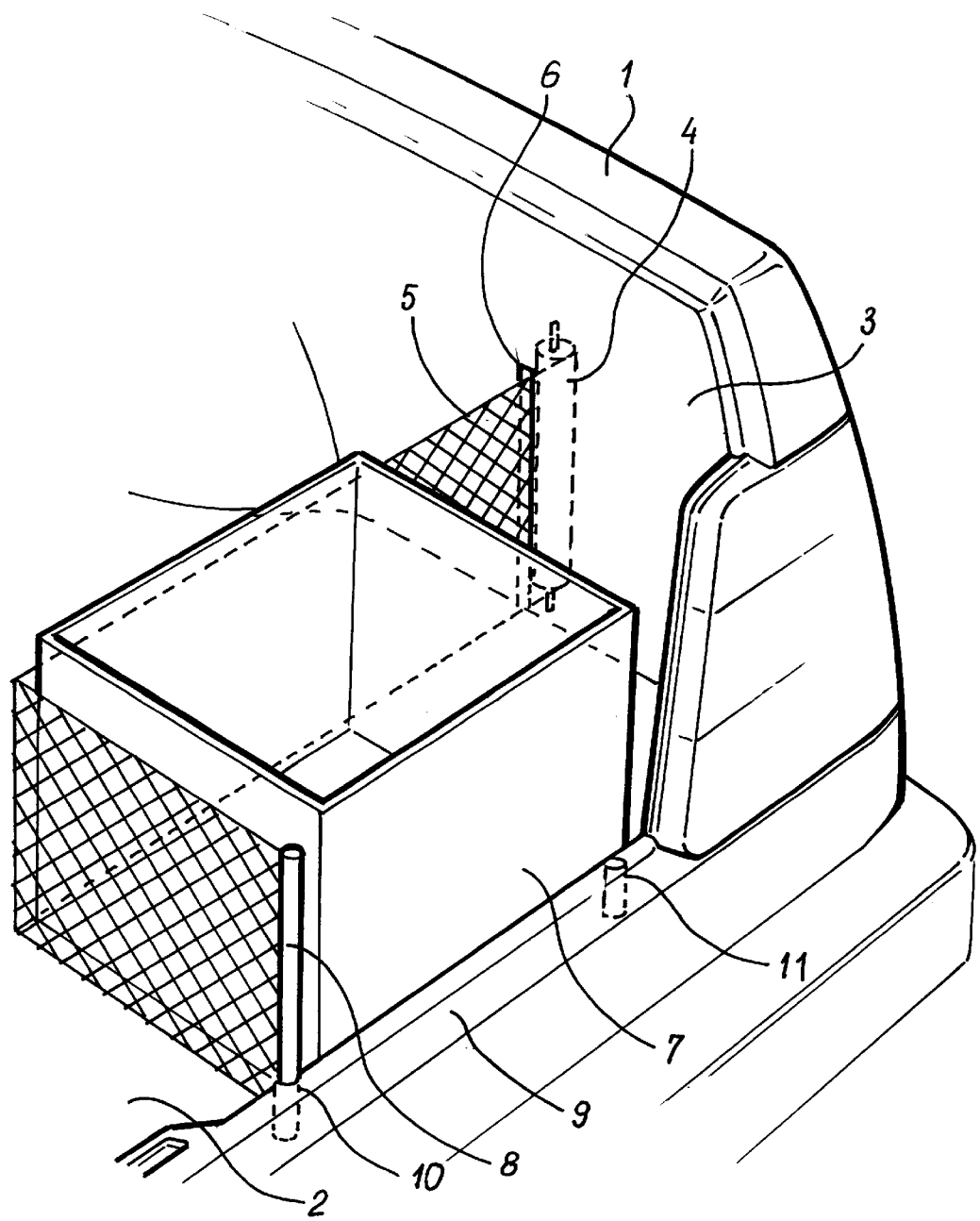
FIG. 1 is a partial, perspective view of a luggage compartment of a motor vehicle which is equipped with a device according to the present invention.

FIG. 1 shows a perspective view of a device according to the present invention. According to a preferred embodiment, the device is arranged in the conventional luggage compartment in the rear part of a vehicle, for example a passenger car. The vehicle comprises a body 1, which is conventionally shaped with a cargo space 2. Inside the cargo space 2, and preferably behind a covering panel 3, is arranged a retracting device 4. The retracting device 4 essentially has the same kind of construction as those retracting devices which are used in connection with conventional seat belts. However, in this device the difference is that the retracting device 4 according to the present invention is arranged for the storage of a retractable cargo net 5. In FIG. 1, the cargo net 5 is shown in its "active" state, in which it is drawn out from the retracting device 4. For this purpose, the cargo net 5 runs through an aperture in the shape of a narrow slit 6, which has been provided in the covering panel 3 in front of the retracting device 5.

The retracting device 4 according to the present invention is arranged with an essentially vertical extension, and has a height which substantially corresponds to the width of the cargo net 5. The cargo net 5 is, in turn, dimensioned according to the most common types of luggage, and according to the height of the luggage compartment 2. For this reason, the cargo net 5 preferably has a width of about 20–40 cm. The dimensions of the apertures 6 are furthermore adapted to the width and thickness of the cargo net 5.

FIG. 1 also shows a piece of luggage 7 in the shape of a box which is intended to be secured in the cargo space 2. For this purpose the cargo net 5 has been rolled out to such a length that it extends around the luggage 7. The cargo net 5 is furthermore locked by means of a special locking arrangement which will now be described in detail. The locking arrangement comprises a bar 8 which is arranged at the free, rolled out end of the cargo net 5. The bar 8 has a length which somewhat exceeds the width of the cargo net 5, and the lower part of the bar 8 is so shaped that it can be moved down into one of the two grooves, 10 and 11, which have been provided in the sill structure 9 of the luggage compartment 2. The two grooves, 10 and 11, thus constitute locking elements which define two different positions for the luggage net 5, i.e. two different sizes of space which the luggage net 5 delimits in the luggage compartment 2. The bar 8 is arranged so that it is mainly vertically disposed in its locked position. For this purpose, the grooves, 10 and 11, are essentially vertically arranged in the sill 9, and have an essentially cylindrical shape which is intended to house the lower part of the bar 8.

Although the embodiment shown in the Figures shows two grooves, 10 and 11, some other number of grooves can be provided in the sill 9. The user then suitably chooses one of the grooves, 10 and 11, depending on the size of the piece of luggage which is to be secured in the luggage compartment 2.

The cargo net 5 is preferably a net of synthetic material or textile. The word "net" is intended to also comprise other arrangements which are suitable for securing luggage, for example tarpaulins, bands, and the like.

The retracting device 4 is, in a known manner, (not shown) fixedly attached to the body 1 of the vehicle. Furthermore, the retracting device 4 is spring-loaded by means of a (not shown) spring mechanism so that the cargo net 5 is automatically retracted when not in use, i.e. when it is not locked in ether of the grooves, 10 and 11.

Figure 2:
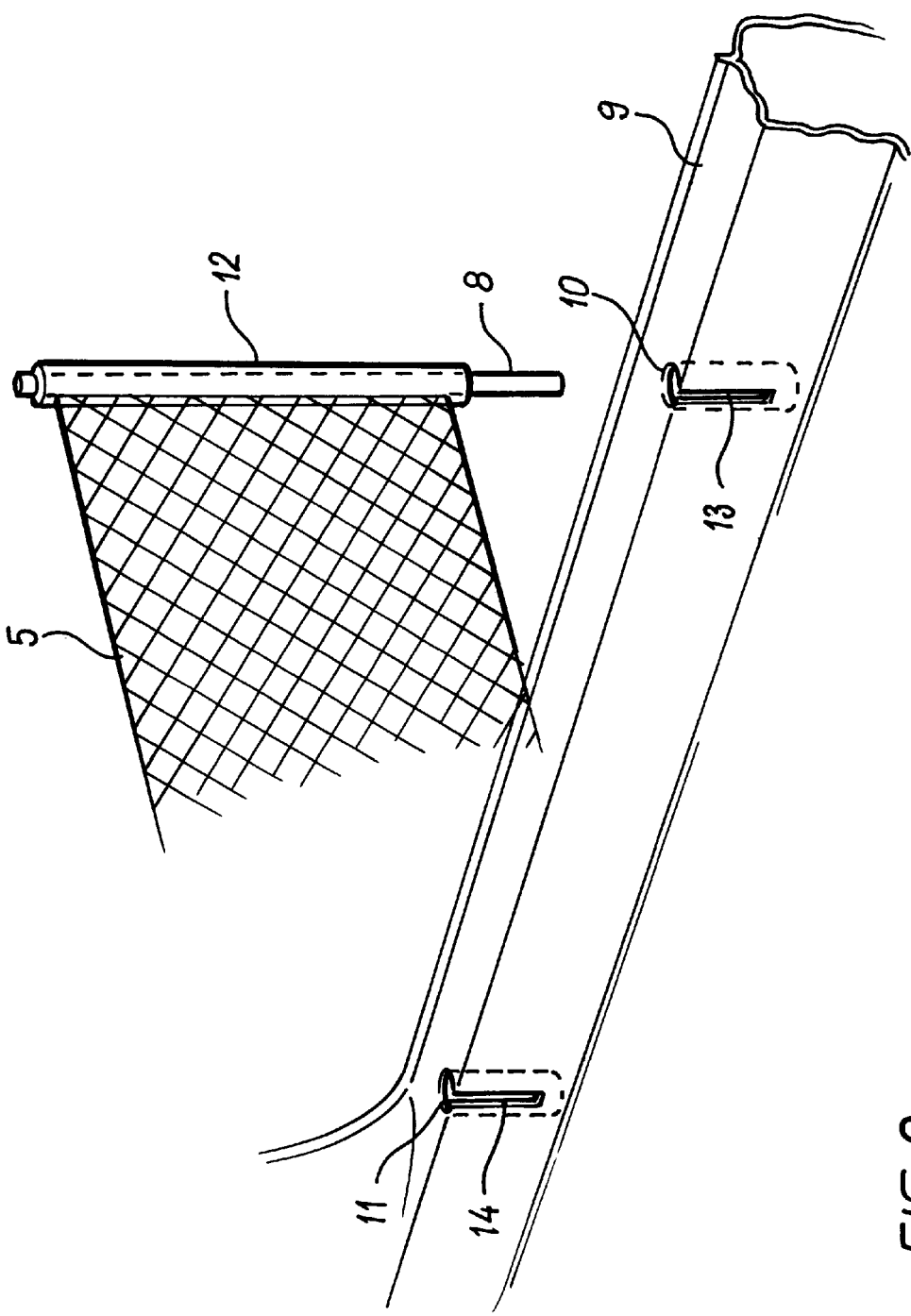
FIG. 2 is a partial, perspective view demonstrating how the cargo net of the present invention can be locked in a luggage compartment.

FIG. 2 shows a perspective view seen from inside the luggage compartment of the luggage net 5 and the sill 9 of the vehicle. The cargo net 5 is, at its free end, provided with bar 8. For this purpose, the end of the cargo net 5 is preferably shaped with a seam or a hem 12, by means of which the bar 8 can be fixed. The grooves, 10 and 11, in the sill 9 of the vehicle are shaped as essentially vertical cylindrical recesses or pipes which are dimensioned to house the bar 8 and the lower part of the hem 12 around the bar 8. Each of the grooves, 10 and 11, is also shaped with a vertically placed slit 13 and 14, which is provided in the forward edge of the sill 9, i.e. the edge which faces the luggage compartment 2. The slits, 13 and 14, have a width which exceeds the thickness of the cargo net 5, which means that the bar 8 and the cargo net 5 can be moved down into the respective grooves, 10 and 11.

Figure 3:
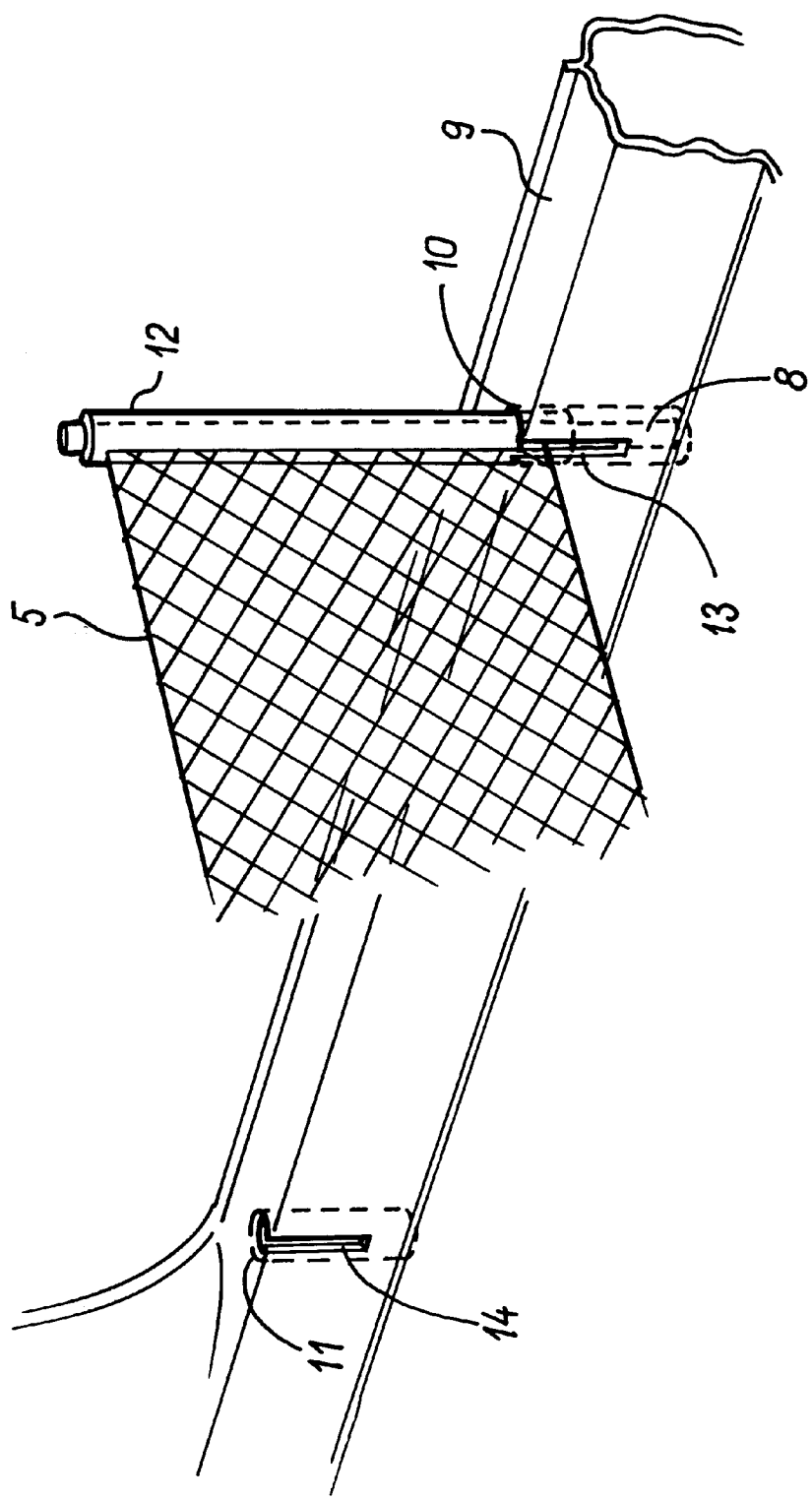
FIG. 3 is a partial, perspective view of the cargo net of FIG. 1 in a locked condition.

FIG. 3 shows a perspective view corresponding to that which is shown in FIG. 2, but in which the cargo net 5 has been positioned so that it is locked. When the cargo net 5 is to be locked, the bar 8 is moved down into the groove 10 whereby the lower part of the cargo net itself also passes through the slit 13. In FIG. 3 it can be seen that the groove 10 is deeper than the slit 13, which enables the bar 8 to be moved down a distance below the lower edge of the slit 13.

Figure 4:
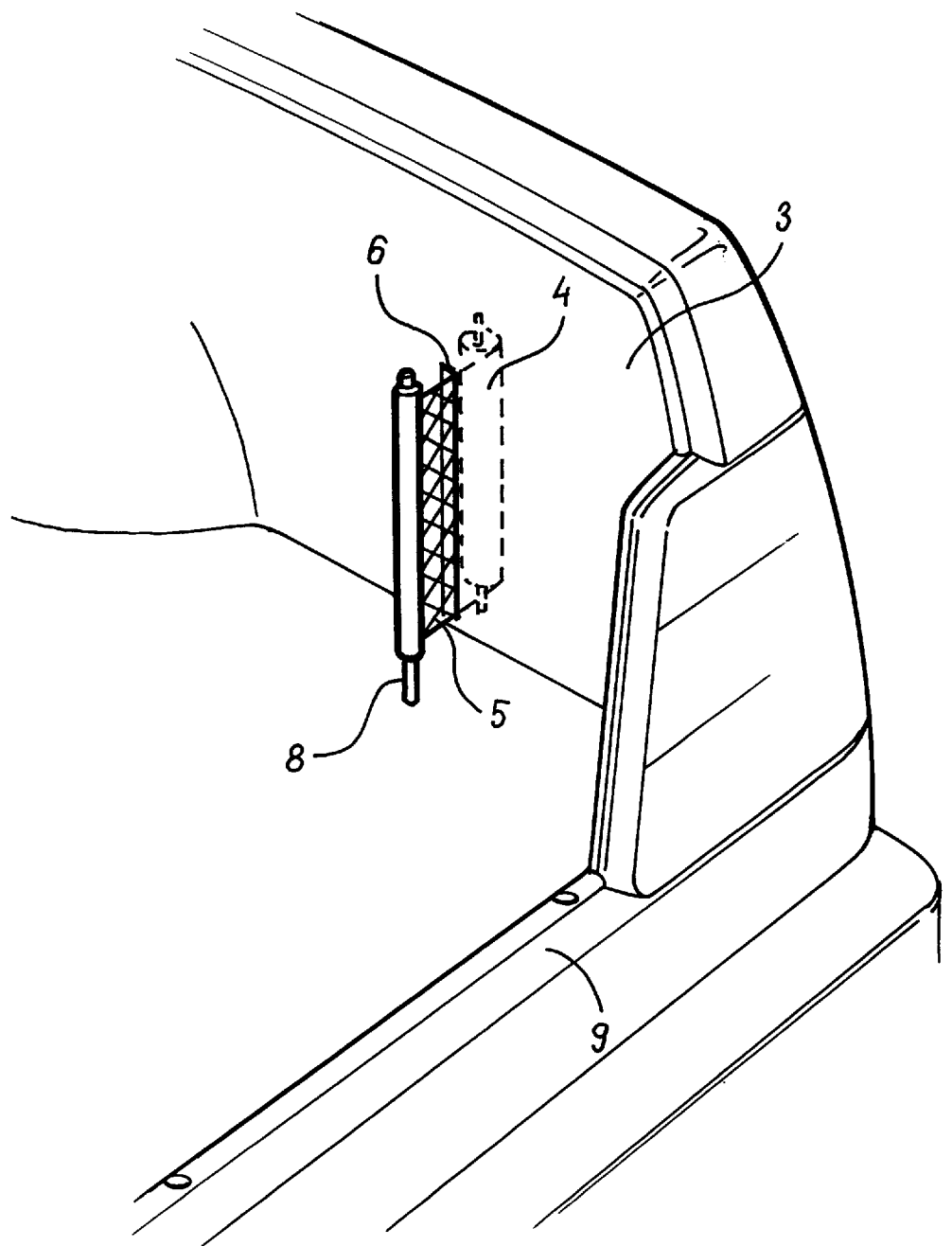
FIG. 4 is a partial, perspective, detailed view of the device according to the present invention in a non-active condition.

FIG. 4 shows the device according to the present invention in its non-locked, "inactive" condition. From the drawing, it can be seen that the bar 8 has a length which exceeds the height of the aperture 6 in the panel 3. This means that the cargo net 5 cannot be retracted in its entirety when it is not used. Instead the bar 8 will be located in a resting position immediately outside of the aperture 6. In this position the bar 8 is easily accessible to a user, so that the cargo net 5 can be pulled out to the required length. Alternatively, the cargo net 5 can be formed with some other kind of stopping mechanism which prevents the bar 8 from being retracted in through the aperture 6 and behind the panel 3. In this case, the length of the bar 8 does not need to exceed the height of the aperture 6.

According to a preferred embodiment of the present invention, the retracting device 4 is of the ALR-kind ("automatic locking retractor") which is a previously known mechanism and will thus not be described in detail here. It is based on the principle that if the cargo net 5 is rolled out to its full length and subsequently slackened to the desired length, the retracting device 5 will lock the cargo net 5 in this latter position. This means that the cargo net 5 cannot be rolled out even if it is pulled out slowly, which is the case with retracting devices for conventional seat-belts. For this reason, the ALR retractor is suited for the invention, since this prevents cargo from moving slowly from its intended position in the luggage compartment 2. In order to provide a simpler detachment of the cargo net 5 after use, the ALR retractor can alternatively be arranged so that it has a certain predetermined slack, on the order of about 5 to 30 mm in the direction in which the cargo net 5 is to be rolled out. This makes it easier for the user to release the cargo net 5 after use by grabbing the upper part of the bar 8 and pulling it towards himself. This means that the cargo net 5 can be lifted out of its attachment in the groove 10.

With renewed reference to FIG. 1, it will become evident that a piece of luggage 7 which has been positioned in the luggage compartment 2 can be secured by the user grabbing the bar 8 and pulling the cargo net 5 out so that it is positioned around the piece of luggage 7. Subsequently, the net 5 is fixed by locking the bar 8 in one of the two grooves, 10 and 11, and preferably that groove which has the most suitable position with respect to the dimensions of the piece of luggage 7.

The present invention is not limited to the above-described embodiment but can be varied within the scope of the appended claims. The invention can, for example, be used in connection with various kinds of vehicles, e.g. passenger cars, trucks or buses.

The bar 8 can also be telescopically retractable and extendable in the end-section of the cargo net 5. This arrangement can be suitable when it is desirable to make the grooves, 10 and 11, very deep. The grooves, 10 and 11, instead of being integrated in the sill 9, can consist of separate components which are, for example, fitted on that side of the sill 9 which faces the luggage compartment 2.

Finally, the grooves, 10 and 11, can have different dimensions and shapes. The grooves, 10 and 11, can, for example, have a square cross-section. In this case the bar 8 is also given a corresponding cross-section.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Cargo compartment for securing cargo in a vehicle comprising a cargo compartment having a retracting device substantially vertically disposed within said cargo compartment, a flexible band retractably attached to said retracting device whereby said flexible band can be withdrawn from said retracting device and retracted into said retracting device, a first locking element comprising an elongated bar affixed to said flexible band, said elongated bar having at least one end section, and a second locking element comprising at least one recess substantially vertically disposed within said cargo compartment whereby only one end section of said elongated bar can be releasably locked in said at least one recess for securing said cargo with said flexible band in said cargo compartment, and said cargo compartment including a sill, wherein said at least one recess is disposed within said sill.

2. Cargo compartment for securing cargo in a vehicle comprising a cargo compartment having a retracting device substantially vertically disposed within said cargo compartment, a flexible band retractably attached to said retracting device whereby said flexible band can be withdrawn from said retracting device and retracted into said retracting device, a first locking element comprising an elongated bar affixed to said flexible band, said elongated bar having at least one end section, and a second locking element comprising at least one recess substantially vertically disposed within said cargo compartment whereby only one end section of said elongated bar can be releasably locked in said at least one recess for securing said cargo with said flexible band in said cargo compartment, and wherein said at least one recess comprises a substantially cylindrical groove including an opening and a vertical slot extending along said cylindrical groove.

3. Cargo compartment for securing cargo in a vehicle comprising a cargo compartment having a retracting device substantially vertically disposed within said cargo compartment, a flexible band retractably attached to said retracting device whereby said flexible band can be withdrawn from said retracting device and retracted into said retracting device, a first locking element comprising an elongated bar affixed to said flexible band, said elongated bar having at least one end section, and a second locking element comprising at least one recess substantially vertically disposed within said cargo compartment whereby only one end section of said elongated bar can be releasably locked in said at least one recess for securing said cargo with said flexible band in said cargo compartment, and wherein said cargo compartment includes at least one panel including an aperture, and wherein said retracting device is disposed on one side of said panel and said flexible band extends through said aperture into said cargo compartment.

4. Cargo compartment for securing cargo in a vehicle comprising cargo compartment having a retracting device substantially vertically disposed within said cargo compartment, a flexible band retractably attached to said retracting device whereby said flexible band can be withdrawn from said retracting device and retracted into said retracting device, a first locking element comprising an elongated bar affixed to said flexible band, said elongated bar telescopically retractable and extendable with respect to said flexible band, said elongated bar having at least one end section, and a second locking element comprising at least one recess substantially vertically disposed within said cargo compartment whereby only one end section of said elongated bar can be releasably locked in said at least one recess for securing said cargo with said flexible band in said cargo compartment.

5. Cargo compartment for securing cargo in a vehicle comprising a cargo compartment having a retracting device substantially vertically disposed within said cargo compartment, said retracting device having an elongated vertical opening, a flexible band having a first end and a second end, only said first end of said flexible band attached to said retracting device whereby said flexible band can be withdrawn from said retracting device and retracted into said retracting device, said flexible band being retractable laterally from said elongated vertical opening within said retracting device, a first locking element comprising a rigid elongated bar affixed to said second end of said flexible band, said rigid elongated bar having a fixed length and at least one end, and a second locking element consisting of at least one recess substantially vertically disposed within said cargo compartment whereby said rigid elongated bar is releasably locked when inserting only said one end of said bar into said at least one recess for securing said cargo with said flexible band in said cargo compartment.

6. The cargo compartment of claim 5, wherein said flexible band between said first and second ends is retracted into said retracting device.

7. A cargo compartment as claimed in claim 5 wherein said cargo compartment has a sill and wherein said at least one recess is integral with said sill.

8. A cargo compartment as claimed in claim 5 wherein said at least one recess comprises a substantially cylindrical groove including an opening and a vertical slot extending along said cylindrical groove.

9. A cargo compartment as claimed in claim 8 wherein said vertical slot has a width that exceeds a thickness of the flexible band.

* * * * *